H. J. JOHNSON.
LAMP.
APPLICATION FILED DEC. 4, 1920.
1,408,513.
Patented Mar. 7, 1922.
3 SHEETS—SHEET 2.
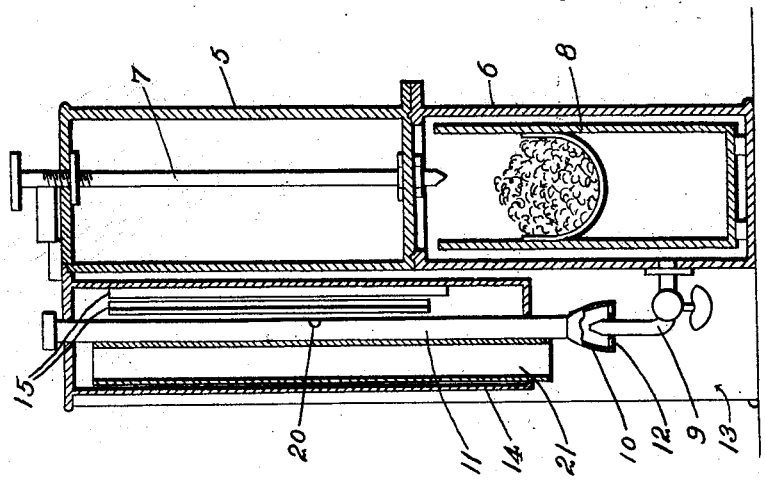
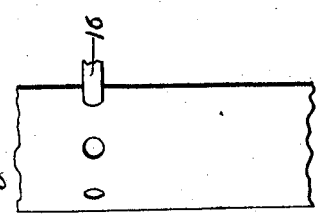
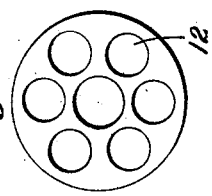
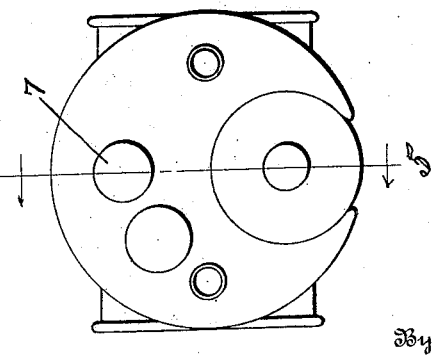
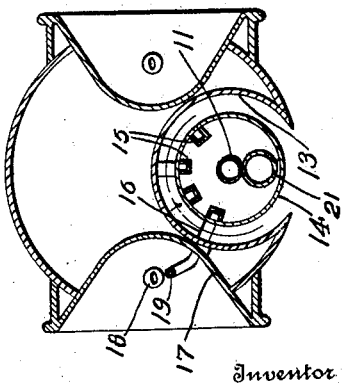
Inventor
H. J. Johnson.
By C.A.Snow & Co.
Attorneys H. J. JOHNSON.
LAMP.
APPLICATION FILED DEC. 4, 1920.
1,408,513.
Patented Mar. 7, 1922.
3 SHEETS—SHEET 3.
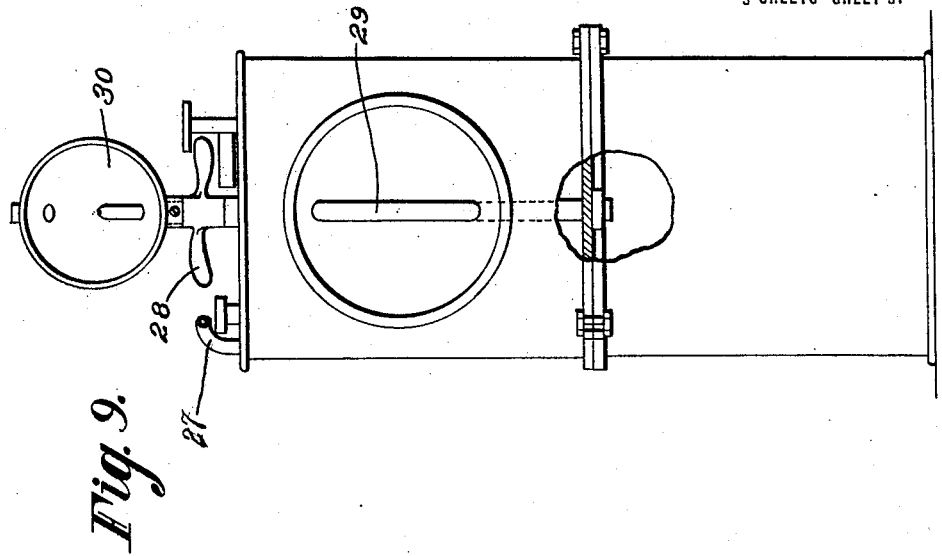
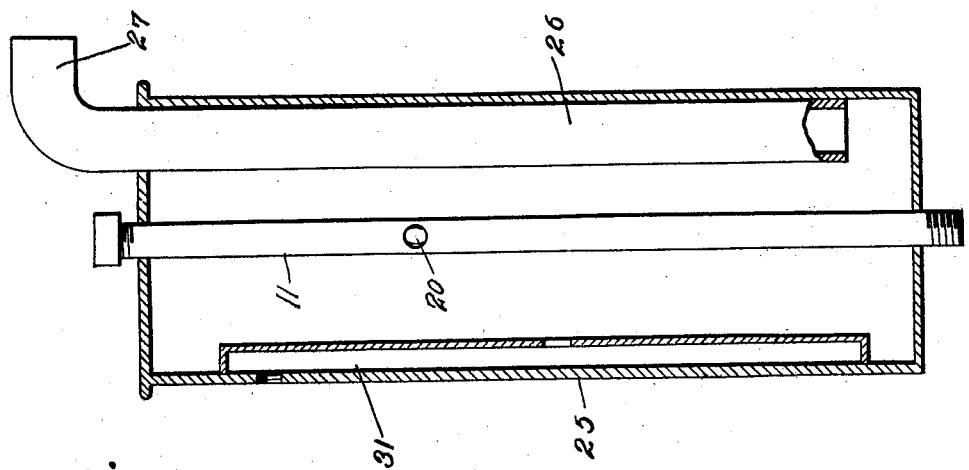
Inventor
H. J. Johnson.
By C. A. Snow & Co.
Attorneys

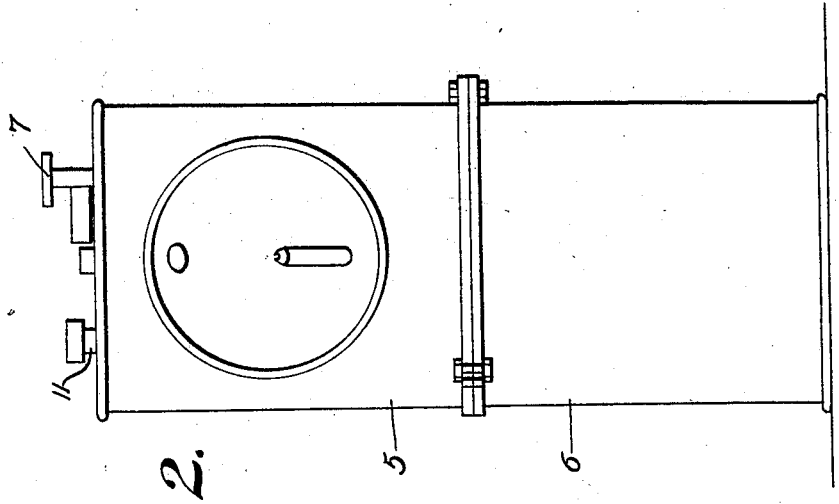
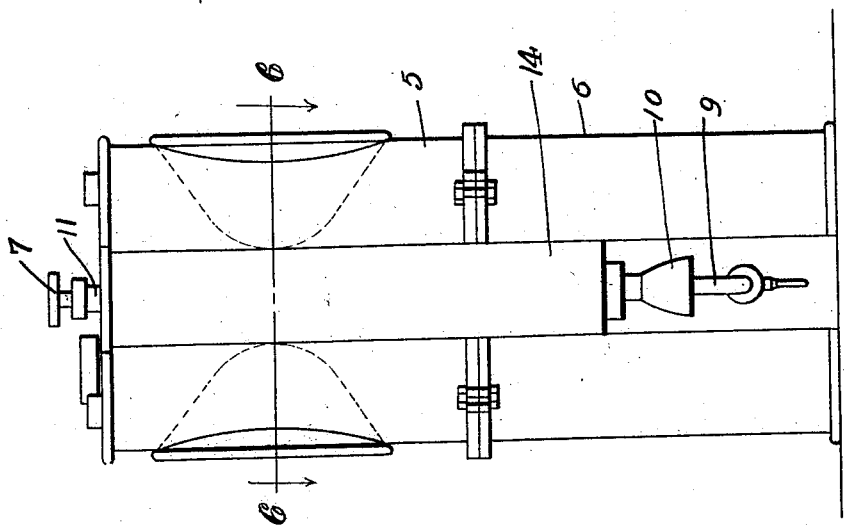

UNITED STATES PATENT OFFICE.

HILDING J. JOHNSON, OF SALT LAKE CITY, UTAH.

LAMP.

1,408,513.  Specification of Letters Patent.  Patented Mar. 7, 1922.

Application filed December 4, 1920. Serial No. 428,349.

*To all whom it may concern:*

Be it known that I, HILDING J. JOHNSON, a citizen of Sweden, residing at Salt Lake City, in the county of Salt Lake and State of Utah, have invented a new and useful Lamp, of which the following is a specification.

This invention relates to illuminating devices especially designed for illuminating fields or the like, wherein cattle or other animals are pastured, it being the object of the invention to provide a means for frightening wild animals from the location.

A further object of the invention is to provide means to produce an audible signal in connection with the light.

A still further object of the invention is to provide means to cause the audible signal to be produced at various intervals.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

Referring to the drawings:—

Figure 1 illustrates a side elevational view of a lamp constructed in accordance with the present invention.

Figure 2 illustrates a front elevational view of the same.

Figure 3 illustrates a plan view of the lamp.

Figure 4 illustrates a fragmental detail view of the regulating tube forming a part of the lamp.

Figure 5 illustrates a vertical sectional view through the lamp, on line 5—5 of Figure 3.

Figure 6 illustrates a transverse sectional view of the same.

Figure 7 illustrates a detail view of the burner hood.

Figure 8 illustrates a vertical sectional view through the body of the lamp, disclosing a modified form of the invention.

Figure 9 illustrates a front elevational view of a modified form of lamp.

Referring to the drawings in detail, the body of the lamp includes an upper section 5 and a lower section 6, the upper section being the water containing section, while the section 6 is the carbide containing section which is fed with water from the section 5, through the medium of the valve 7, whereby quantities of water may be dropped onto the carbide, forming a gas.

Positioned within the lower section 6 is a container 8, which has its walls spaced from the inner walls of the lower section to provide a gas passageway through which the gas passes on its entrance to the nozzle 9 that has one end in communication with the passageway, the opposite or discharge end thereof being disposed within a hood 10 formed at the lower extremity of the regulating tube 11.

This hood 10 is provided with openings 12 to admit air to the tube, the quantity of air being regulated to admit a quantity of oxygen for perfect combustion.

The body portion of the lamp is provided with a curved portion 13 forming a housing for the barrel 14 in which are supported the pipes 15, the pipes being of various lengths as indicated more clearly by Figure 5 of the drawings, each pipe being however provided with a suitable opening to register with a pipe 16 which extends through the reflector body 17, one end thereof being disposed in proximity to the burner 18.

The upper ends of these pipes 15 are closed, while the lower ends thereof are open to permit gas to pass upwardly therein, so that the pipe 15 which is in register with the pipe 16, will supply fuel to the end 19 thereof.

Disposed within the tube 11, at a point substantially intermediate the ends, is an opening 20 through which the gas passes on its entrance to the barrel 14, thus filling the barrel 14.

Supported within the barrel 14 at a point adjacent to the tube 11 is a pipe 21 which has its ends open to permit gas to enter the upper extremity thereof and pass outwardly through the lower extremity 21. In the modified form of the invention as illustrated by Figures 8 and 9 of the drawings, the rotatable barrel 25 is provided with a tube 26 which has its lower extremity disposed within the barrel 25, the upper end thereof extending at right angles as at 27, to discharge against the blades 28 which are secured to the lamp supporting shaft 29, thereby causing the lamp 30 to revolve at intervals.

In this form of the invention the barrel is moved to bring one of the pipes 31 into communication with a suitable pipe not shown, to direct gas to the burner, causing a back-firing in the pipes 31 and in the tube 26.

In the operation of the device, the barrel 14 is moved to bring one of the pipes 15 into communication with the pipe 16 whereupon the gas is ignited at the end 19 of the pipe 16. It follows that the back-firing also takes place in the pipe 21 causing a loud report.

In the form of the invention as illustrated by Figures 8, 9 and 10 of the invention, the back-firing is accomplished in the same manner, except the force of back-fire is directed to the blades 28 to cause the rotation of the lamp 30.

Having thus described the invention, what is claimed as new is:—

1. In a device of the character described, an upper section and a lower section, means for generating gas in the lower section, a rotatable barrel associated with the sections, a supply tube disposed within the barrel and having a central opening, a plurality of pipes disposed within the barrel, a burner, means to bring one of said pipes into communication with the burner to ignite gas within the pipe, and a relatively large pipe within the tube to receive the back-fired gas.

2. In a device of the character described, an upper section and a lower section, means for generating gas in the lower section, a regulating tube associated with the sections, a movable barrel, a plurality of pipes of various lengths supported within the barrel, a pipe for discharging gas to a burner, the first mentioned pipe adapted to be moved into communication with the latter pipe, a relatively long pipe supported within the barrel and having its upper end disposed in spaced relation with the upper end of the barrel, and having its lower end disposed at the lower end of the barrel, to discharge burnt gases.

3. In a device of the character described, an upper section and a lower section, means for generating gas in the lower section, a movable barrel associated with the sections, said barrel adapted to be rotated, a pipe supported adjacent the barrel and adapted to provide communication between the interior of the barrel and the burner, a plurality of pipes supported within the barrel, said barrel having openings in the walls thereof providing communication with the plurality of pipes and the atmosphere, a pipe extending through the barrel and adapted to supply gas thereto, and a pipe for permitting gas to discharge from the barrel at the lower end thereof.

4. In a device of the character described, an upper section and a lower section, means for generating gas in the lower section, a rotatable barrel supported by the sections, means for delivering gas to the barrel, means for delivering gas from the barrel to the burner, and means within the barrel for receiving the burnt gas.

5. In a device of the character described, an upper section and a lower section, means for generating gas in the lower section, a barrel associated with the sections, a burner supported by the sections, means for delivering gas to the barrel, means for delivering gas from the barrel to the burner, at intervals, and a pipe disposed within the barrel for receiving the fired gas.

6. In a device of the character described, an upper section and a lower section, means for generating gas in the lower section, a rotatable lamp disposed above the upper section and adapted to be fed with gas from the lower section, blades disposed under the lamp and secured thereto, a pipe having one end thereof disposed in proximity to the blades, means for igniting gas to cause a back-fire within the pipe, and said pipe adapted to direct the fired gas to the blades to rotate the lamp.

In testimony that I claim the foregoing as my own, I have hereto affixed my signature in the presence of two witnesses.

HILDING J. JOHNSON.

Witnesses:
 HERBERT E. SMYTH,
 A. G. McINTYRE.